Patented Apr. 5, 1932

1,852,021

UNITED STATES PATENT OFFICE

WILBER B. MILLER, OF FLUSHING, NEW YORK, ASSIGNOR TO OXWELD ACETYLENE COMPANY, A CORPORATION OF WEST VIRGINIA

ARC-WELDING ELECTRODE

No Drawing.  Application filed September 22, 1925. Serial No. 57,944.

This invention relates to electric arc welding of metal bodies, and particularly to welding carried out by using as one terminal of an arc an alloy containing various percentages of chromium, together with one or more other elements such as nickel, silicon, manganese, cobalt, iron, tungsten and carbon, and transferring particles of this welding electrode by means of the arc to the work to be welded.

The invention has for an object the improvement of welds of this character. This object is attained by coating welding rods or electrodes with compositions which are novel for this purpose, as more fully described below.

Welding electrodes of chrome iron, stainless steel, rustless iron and high speed cutting tool alloys such as those in which the alloying elements consist principally of cobalt, chromium and tungsten, are desirable for welding parts or structures of the same or similar chemical composition, so that the finished welded article will consist of base metal and deposited weld metal of approximately the same chemical composition and physical properties. When electrodes of such alloys are used in the uncoated condition, porous and otherwise unsatisfactory deposits are obtained. This is probably due at least in part to the oxidation of chromium, the oxide formed being highly infusible and preventing the solidification of the fused metal to a dense continuous mass free from blowholes, slag and oxide films.

I have discovered that a weld which is in many respects superior to those obtainable with uncoated welding electrodes may be produced by the use of welding rods or electrodes of the alloys above mentioned which are coated with certain compositions. As illustrative of the invention, and without limitation to the specific materials or proportions stated, very satisfactory results have been obtained with a coating composition consisting of equal parts by weight of silica flour, sodium borosilicate glass and an alloy of magnesium, manganese and silicon having approximately the following composition:

| | Per cent |
|---|---|
| Magnesium | 8.5 |
| Manganese | 46.3 |
| Silicon | 32.8 |
| Iron | 7.0 |
| Carbon | .4 |

The metallic and other ingredients mentioned are formed into a finely powdered mixture which is mixed with a suitable binding material to form a thin paste and applied to the welding rods by painting or dipping. As a binding material an aqueous solution of gum arabic or dextrin or a dilute alcoholic shellac solution may be used.

Another coating mixture which has given very satisfactory results comprises the above-mentioned ingredients in the following proportions by weight:

| | Per cent |
|---|---|
| Silica flour | 26 |
| Borosilicate glass | 32 |
| Mg-Mn-Si alloy | 42 |

Satisfactory results have been obtained by using various combinations of all or some of the above materials. For example, mixtures of sodium borosilicate glass and the alloy above-mentioned within the following range of proportions may be used:

| | Parts by weight |
|---|---|
| Borosilicate glass | 5–95 |
| Mg-Mn-Si alloy | 95– 5 |

Very satisfactory results have been obtained with a coating mixture having approximately the following composition:

| | Per cent |
|---|---|
| Silica flour | 90–95 |
| Mg-Mn-Si alloy | 10– 5 |

Also, mixtures of silica flour and the magnesium-manganese-silicon alloy within the following range of proportions may be used:

| | Parts by weight |
|---|---|
| Silica flour | 10–90 |
| Mg-Mn-Si alloy | 90–10 |

Since the magnesium-manganese-silicon alloy used in the specific examples is approximately one-half manganese, it will be apparent that all the coatings referred to in the examples contain between 2.5% and 45% of unoxidized manganese.

The sodium borosilicate glass which I prefer to use in the coating mixture has been prepared by fusing a mixture of two parts borax and one part silica by weight and finely grinding the vitreous product. The proportions of borax and silica used in making the glass may be varied through a wide range. Mixtures containing as high as four parts borax to one of silica have been used. Instead of first forming the borosilicate glass, good results may be obtained by fusing the borax to remove the water of crystallization and then mixing it with silica flour and magnesium-manganese-silicon alloy.

It is to be understood that other alloys or metallic or alloy mixtures containing magnesium, manganese and silicon or one or more of these elements as essential components may be substituted for the specific alloy composition above-mentioned. The following alloys have been used with satisfactory results: manganese-silicon; ferro-silicon; ferro-manganese; and calcium-silicon.

I claim:

1. A welding electrode consisting of a core of welding metal alloy comprising chromium and a coating carried thereon, said coating consisting of, besides binder, from 5% to 50% of a metallic element of the group consisting of magnesium, manganese and silicon and at least 50% of oxygen-containing compounds of boron and silicon, the weight of the oxygen-containing compound of boron being from twice to four times that of the oxygen-containing compound of silicon.

2. A welding electrode consisting of a core of welding metal alloy comprising chromium and a coating carried thereon, said coating consisting of, besides binder, from 5% to 50% of a metallic element of the group consisting of magnesium, manganese and silicon and at least 50% of the constituents of a borosilicate glass.

3. A welding electrode consisting of a core of welding metal alloy comprising chromium and a coating carried thereon, said coating consisting of, besides binder, from 5% to 50% of an alloy of magnesium, manganese and silicon and at least 50% of the constituents of a borosilicate glass.

In testimony whereof, I affix my signature.

WILBER B. MILLER.